(12) United States Patent
Johansson (10) Patent No.: US 9,669,368 B2
(45) Date of Patent: Jun. 6, 2017

(54) DEVICE FOR STIRRING

(71) Applicant: Metenova Holding AB, Molndal (SE)

(72) Inventor: Sten Johansson, Göteborg (SE)

(73) Assignee: Metenova Holding AB, Mölndal (SE)

( * ) Notice: Subject to any disclaimer, the term of this patent is extended or adjusted under 35 U.S.C. 154(b) by 0 days.

(21) Appl. No.: 14/326,213

(22) Filed: Jul. 8, 2014

(65) Prior Publication Data

US 2015/0124557 A1 May 7, 2015

Related U.S. Application Data

(63) Continuation of application No. 13/449,670, filed on Apr. 18, 2012, now Pat. No. 8,783,942, which is a
(Continued)

(51) Int. Cl.
  *B01F 13/08* (2006.01)
  *F16C 32/04* (2006.01)

(52) U.S. Cl.
  CPC ...... *B01F 13/0827* (2013.01); *B01F 13/0872* (2013.01); *F16C 32/0417* (2013.01); *F16C 32/0427* (2013.01)

(58) Field of Classification Search
  CPC .......................... B01F 13/0845; B01F 13/0827
(Continued)

(56) References Cited

U.S. PATENT DOCUMENTS 1,993,841 A  3/1935 House
3,572,651 A  3/1971 Harker
(Continued)

FOREIGN PATENT DOCUMENTS

DE       4232936       4/1994
JP      2004534374    11/2004
(Continued)

OTHER PUBLICATIONS

Machine Translation of JP 2006122785.
(Continued)

*Primary Examiner* — Abbas Rashid
(74) *Attorney, Agent, or Firm* — Finnegan, Henderson, Farabow, Garrett & Dunner LLP (57) ABSTRACT

A device for stirring a liquid or a granular material comprising a stirring agitator, a rotating drive shaft for rotating the stirring agitator, a rotating drive shaft for rotating the stirring agitator, a stationary axle extending in an essentially vertical direction about which the stirring agitator is adapted to rotate, and a transfer arrangement for contactless transfer of rotation of the drive shaft to the stirring agitator. The device has a center axis around which the stirring agitator and the drive shaft are adapted to rotate, and means for generating a magnetic force exerting an upwardly directed force component on the stirring agitator. The means for generating a magnetic force comprises a first element arranged in a stirring agitator and a second element associated with the stationary axle. At least one of the first element and the second element comprises a permanent magnet. At least one of the first element and the second element is arranged such that the center axis extends through the first element and/or the second element.

13 Claims, 5 Drawing Sheets

Related U.S. Application Data continuation of application No. PCT/SE2009/051201, filed on Oct. 21, 2009.

(58) Field of Classification Search
USPC .................................... 366/273, 274; 416/3
See application file for complete search history.

(56) References Cited

U.S. PATENT DOCUMENTS

| | | | |
|---|---|---|---|
| 3,622,129 A | | 11/1971 | Mazowski |
| 4,209,259 A | | 6/1980 | Rains et al. |
| 4,465,377 A | | 8/1984 | de Bruyne |
| 4,483,623 A | | 11/1984 | Eaton et al. |
| 4,534,656 A | | 8/1985 | de Bruyne |
| 4,993,841 A | | 2/1991 | Lofgren et al. |
| 5,393,142 A | | 2/1995 | Meier |
| 5,478,149 A | | 12/1995 | Quigg |
| 5,779,359 A | | 7/1998 | Gambrill et al. |
| 5,831,362 A | * | 11/1998 | Chu et al. ............ 310/90.5 |
| 5,961,213 A | * | 10/1999 | Tsuyuki et al. ....... 366/273 |
| 6,065,865 A | * | 5/2000 | Eyraud et al. ........ 366/273 |
| 6,118,199 A | | 9/2000 | Lembke |
| 6,206,562 B1 | * | 3/2001 | Eyraud et al. ........ 366/273 |
| 6,568,844 B1 | | 5/2003 | Arthun et al. |
| 6,663,276 B2 | | 12/2003 | Yale |
| 6,675,877 B2 | * | 1/2004 | Sandu et al. ............ 165/91 |
| 6,733,171 B2 | * | 5/2004 | Schob ................... 366/273 |
| 7,086,778 B2 | | 8/2006 | Terentiev |
| 7,396,153 B2 | * | 7/2008 | Andersson ............ 366/273 |
| 2004/0047232 A1 | * | 3/2004 | Terentiev ............. 366/273 |
| 2006/0092761 A1 | * | 5/2006 | Terentiev ............. 366/274 |
| 2006/0133194 A1 | | 6/2006 | Takahashi |
| 2007/0165485 A1 | * | 7/2007 | Cai ..................... 366/273 |
| 2009/0130740 A1 | | 5/2009 | Ophardt |

FOREIGN PATENT DOCUMENTS

| | | |
|---|---|---|
| JP | 2005080662 | 3/2005 |
| JP | 2006122785 | 5/2006 |
| WO | WO 02/41484 | 5/2002 |
| WO | WO 2009/093995 | 7/2009 |

OTHER PUBLICATIONS

English Language Abstract for JP 2004534374.
English Language Abstract for JP 2005080662.
English Language Abstract for DE 4232936.
Mavadrive Boden and Aufsetsmagnetrührwerke, Mavag AG (2003) (English Version).
Mit Optimiertem Reinigungsverhalten (Jan. 4, 2000).
Millipore—NovAseptik Mixers, Millipore Corporation (2006).

* cited by examiner

DEVICE FOR STIRRING

TECHNICAL FIELD

The present invention relates to a device for stirring a liquid or a granular material according to the precharacterizing portion of claim 1.

BACKGROUND

Devices for stirring may be used in vessels for mixing liquids and/or granular material for instance in process industry. Devices for stirring may also be used for stirring contents of a vessel while the contents are heated or cooled or while a chemical or biological process takes place in the vessel. Generally a stirring agitator is arranged inside the vessel whereas a driving arrangement for rotating the stirring agitator is arranged outside the vessel.

The rotation may be transferred from the driving arrangement to the stirring agitator by means of a drive shaft extending through a wall of the vessel from outside the vessel into the vessel and the stirring agitator. The drive shaft must be sealed by means of a seal between the stationary vessel and the rotating drive shaft. There is a risk of such seals contaminating liquid or other material inside the vessel with seal material and there is a risk of leakage through the seal. After stirring and emptying of the vessel there is also a problem with cleaning such a seal from liquid or material that has been stirred in the vessel. In particular, such a seal may comprise cavities, in which liquid or material may collect and which are difficult to clean.

Therefore, contactless transfer of rotation from the driving arrangement outside the vessel to the stirring agitator inside the vessel may be preferred in industry where hygienic requirements are high, such as medical, food or biotech industry. Contactless transfer of rotation to the stirring agitator has the advantage that there is no need for a rotating axle to extend through a wall of the vessel and may be achieved by means of a first set of magnets arranged in a drive shaft outside the vessel and a second set of magnets arranged in the stirring agitator inside the vessel. Such a stirring agitator is supported by one or more bearings inside the vessel. In particular a bearing subjected to axial forces, i.e. when the stirring agitator is arranged to rotate about a vertical axis, is prone to wear and may thus contaminate a liquid or material inside the vessel.

US2004/0057232 A1 discloses a system using a rotating mixing element where permanent magnets are used to provide a levitation-assist function to prevent the mixing element from contacting an adjacent vessel. The permanent magnets are ring magnets arranged at a distance from an axis of rotation.

U.S. Pat. No. 7,396,153 discloses a magnetically coupled liquid mixer. A first magnet array in a rotating drive hub affects a second magnet array in a driven portion such that there is a space, S, between the driven portion and a drive mount for supporting the driven portion in a vessel. The first and second magnet arrays are arranged in a ring at a distance from an axis of rotation. In some disclosed embodiments thrust forces on the driven portion make a first and a second thrust bearing come into contact with each other during operation, in which case the first and the second thrust bearings may be subjected to wear as mentioned above.

U.S. Pat. No. 5,393,142 discloses an impeller for stirring sterile liquids. The impeller is mounted by means of a bearing providing rotatable fixation with a seating surface in a container. The use of a bearing which is subjected to axial forces will mechanically affect the liquid to be stirred, which may not be desirable for certain liquids. Axial forces on the bearing may also entail that dust from the bearing due to mechanical wear ends up in the container.

SUMMARY

An object of the present invention is, to provide an improved suspension of a stirring agitator in a device for stirring where there is contactless transfer of rotation to the stirring agitator.

According to an aspect of the invention, the object is achieved by a device for stirring a liquid or a granular material comprising a stirring agitator, a rotating drive shaft for rotating the stirring agitator, a stationary axle extending in an essentially vertical direction about which the stirring agitator is adapted to rotate, and a transfer arrangement for contactless transfer of rotation of the drive shaft to the stirring agitator. The device has a centre axis around which the stirring agitator and the drive shaft are adapted to rotate and means for generating a magnetic force exerting an upwardly directed force component on the stirring agitator. The means for generating a magnetic force comprises a first element arranged in the stirring agitator and a second element associated with the stationary axle. At least one of the first element and the second element comprises a permanent magnet. At least one of the first element and the second element is arranged such that the centre axis extends through, or in the near proximity of, the first element and/or the second element.

Since at least one of the first element and the second element is arranged on the centre axis it is ensured that the magnetic force is directed along a vector coinciding with or crossing the centre axis. An advantageous direction of the magnetic force for supporting the stirring agitator is achieved.

As a result, the above mentioned object is achieved.

It is to be understood that an upwardly directed force is a force directed in a direction opposite to gravity force. A force exerting an upwardly directed force component on the stirring agitator comprises a force component which is directed opposite to the gravity force exerted on the stirring agitator.

According to example embodiments the first element and the second element may be arranged such that centre axis extends through the first element and the second element. In this manner the magnetic force may be directed along a vector coinciding with the centre axis.

According to example embodiments the first element and the second element may be arranged symmetrically about the centre axis. Again, in this manner it may be ensured that the magnetic force coincides with centre axis and further that the magnetic force affects the stirring rotator in a symmetrical manner. Radial forces between the stirring agitator and the stationary axle may thus be kept at a minimum.

According to example embodiments the second element may be arranged in or on the stationary axle.

According to example embodiments the first element may be arranged in a centre portion of the stirring agitator above the stationary axle.

According to example embodiments the second element is arranged in a top portion of the stationary axle.

According to example embodiments the first element and the second element may both comprise a permanent magnet.

According to example embodiments one of the first element and the second element comprises a non-permanently magnetic material which is magnetically attractable.

According to example embodiments the magnetic force may be a repelling force.

According to example embodiments the magnetic force may be an attracting force.

According to example embodiments the device may comprise a radial bearing for radially supporting the stirring agitator on the stationary axle and the transfer arrangement may be arranged below the radial bearing. Combing a radial bearing with means for generating an upwardly directed force utilizing magnetic force may avoid axial forces to be supported by a bearing. Since axial forces of a stirring agitator may be considerably larger than radial forces this may be an advantageous aspect when stirring certain liquids or granular material. Also, in this manner a primary function of the transfer arrangement need not be a bearing function. Instead, it may be optimized for contactless transfer of rotation from the drive shaft to the stirring agitator. It is to be understood that the radial bearing may support radial forces only, i.e no axial forces.

According to example embodiments the device may further comprises an electric motor for driving the drive shaft.

According to example embodiments the stationary axle may be associated with a vessel adapted to receive the liquid or the granular mixture to be stirred.

Further features of, and advantages with, the present invention will become apparent when studying the appended claims and the following description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

Well-known functions or constructions may not be described in detail for brevity and/or clarity.

Figure 1:
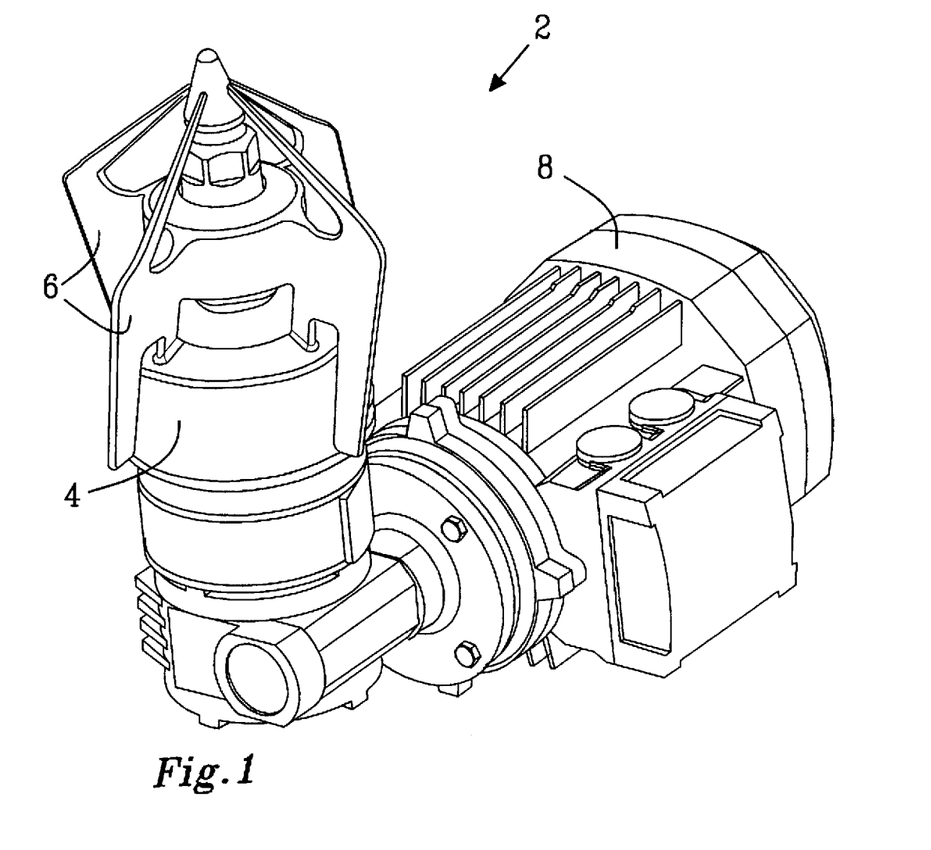
FIG. 1 illustrates a device for stirring a liquid or a granular material according to example embodiments.

FIG. 1 illustrates a device 2 for stirring a liquid or a granular material according to example embodiments. The device 2 comprising a stirring agitator 4 provided with four blades 6. The stirring agitator 4 is rotated by means of a non-shown vertical drive shaft such that the blades 6 will stir the liquid or granular material. The non-shown drive shaft is driven by an electric motor 8. A non-shown transfer arrangement transfers rotation of the drive shaft to the stirring agitator 4.

Figure 2:
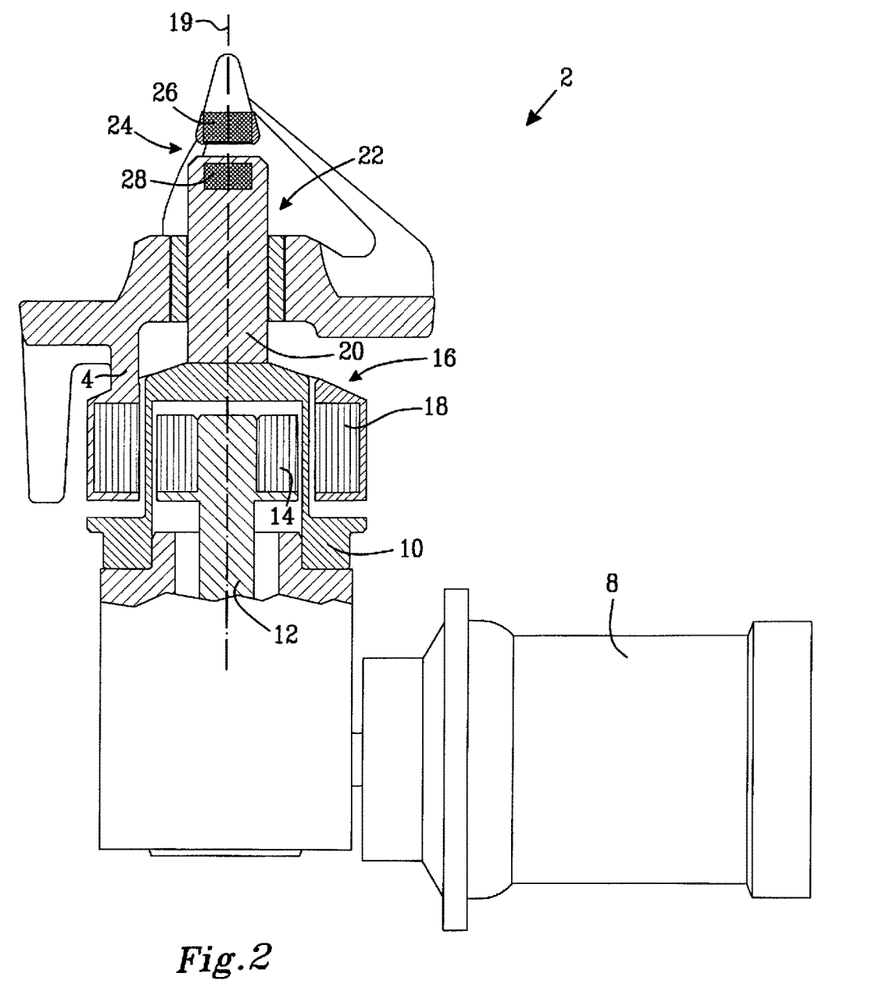
FIG. 2-5 illustrates a section through a device for stirring a liquid or a granular material according to example embodiments.

FIG. 2 illustrates a section through a device 2 for stirring a liquid or a granular material according to example embodiments. Inside a stationary housing 10 of the device 2 a vertical drive shaft 12 is arranged. The drive shaft 12 is driven by a non-shown outgoing axle of an electric motor 8. At an upper end of the drive shaft 12 there is arranged a first part 14 of a transfer arrangement 16 for contactless transfer of rotation of the drive shaft 12 to a stirring agitator 4. The stirring agitator 4 comprises at its base a second part 18 of the transfer arrangement 16. The contactless transfer arrangement 16 may for instance comprise one or more magnets in the first part 14 and one or more magnets in the second part 18. When the drive shaft 12 rotates the mutual attracting and/or repelling of the magnets transfers the rotation of the drive shaft 12 to the stirring agitator 4. The stirring agitator 4 and the drive shaft 12 rotate about a centre axis 19.

A stationary axle 20 extends from the housing 10. The drive shaft 12 extends from the housing 10 into the stationary axle 20 such that the transfer arrangement 16 is arranged at a lower end of the stationary axle 20. The stationary axle 20 comprises a radial bearing 22 arranged above the transfer arrangement 16. The radial bearing 22 comprises a stationary portion on the stationary axle 20 and rotatable portion on the stirring agitator 4. At an upper end of the device 2 there is arranged a means 24 for generating a magnetic force exerting an upwardly directed force on the stirring agitator 4. In this manner the weight of the stirring agitator 4 is supported by the magnetic force. Whereas some of the weight of the stirring agitator 4 may be supported by an axial bearing at an upper end of the stationary axle, a majority or the weight should be supported by the magnetic force. According to some embodiments the entire weight of the stirring agitator 4 is supported by the magnetic force and thus there is no need for any axial bearing taking up axial forces.

The means 24 for generating a magnetic force comprises a first element 26 comprising a magnet arranged in a centre portion of the stirring agitator 4 and a second element 28 comprising a magnet arranged in a top portion of the stationary axle 20. The poles of the magnets are arranged such that they repel each other and in this manner the upwardly directed magnetic force is generated. Suitably the magnets are permanent magnets.

A non-shown vessel adapted to contain liquid or granular material to be stirred may be connected to the housing 10 of the device 2 such that the housing 10 and the vessel form one integral unit, e.g. a stationary unit with the electric motor 8 arranged below the vessel. Inside the integral unit the stirring agitator 4 is placed on the stationary axle 20 for stirring liquid or granular material. After stirring, the stirring agitator 4 may be removed such that the inside of the vessel with the stationary axle 20 and the stirring agitator 4 may be cleaned separately before a further batch is stirred.

Example embodiments may be combined as understood by a person skilled in the art. Even though the invention has been described with reference to example embodiments, many different alterations, modifications and the like will become apparent for those skilled in the art.

Figure 3:
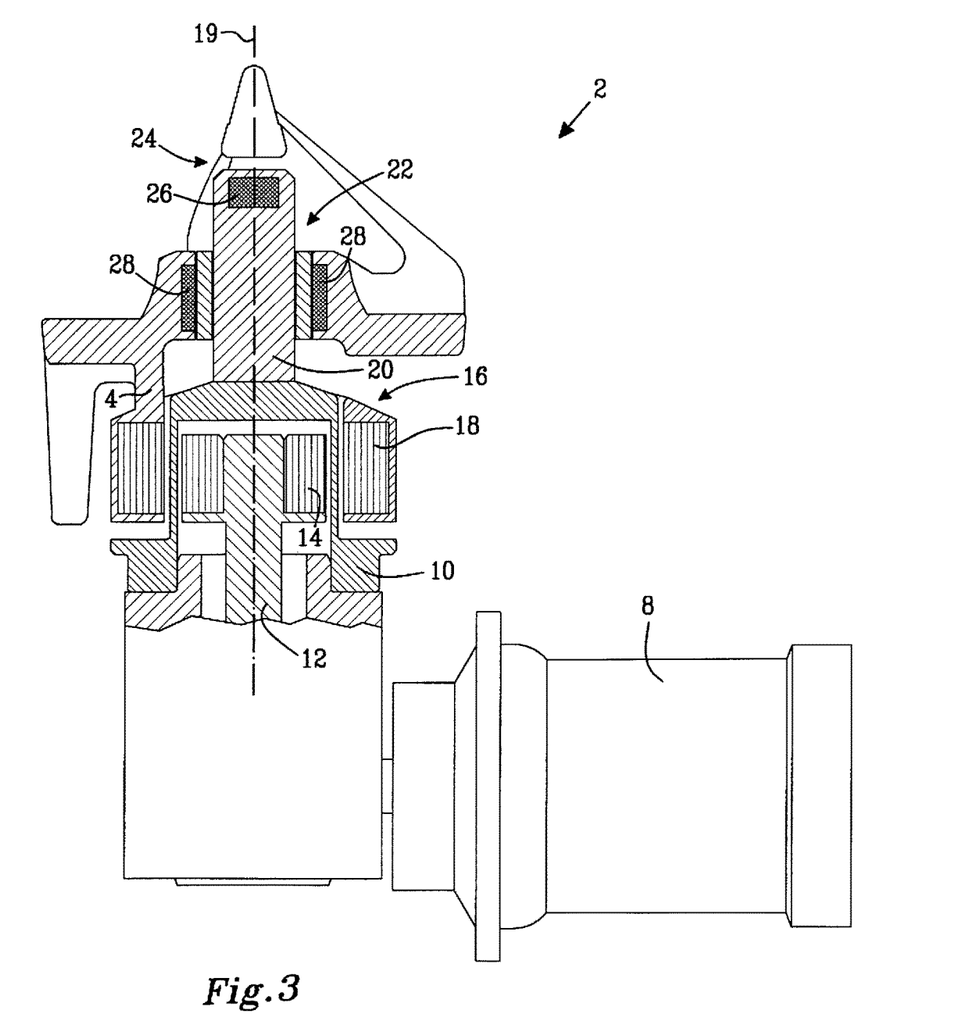
Figure 4:
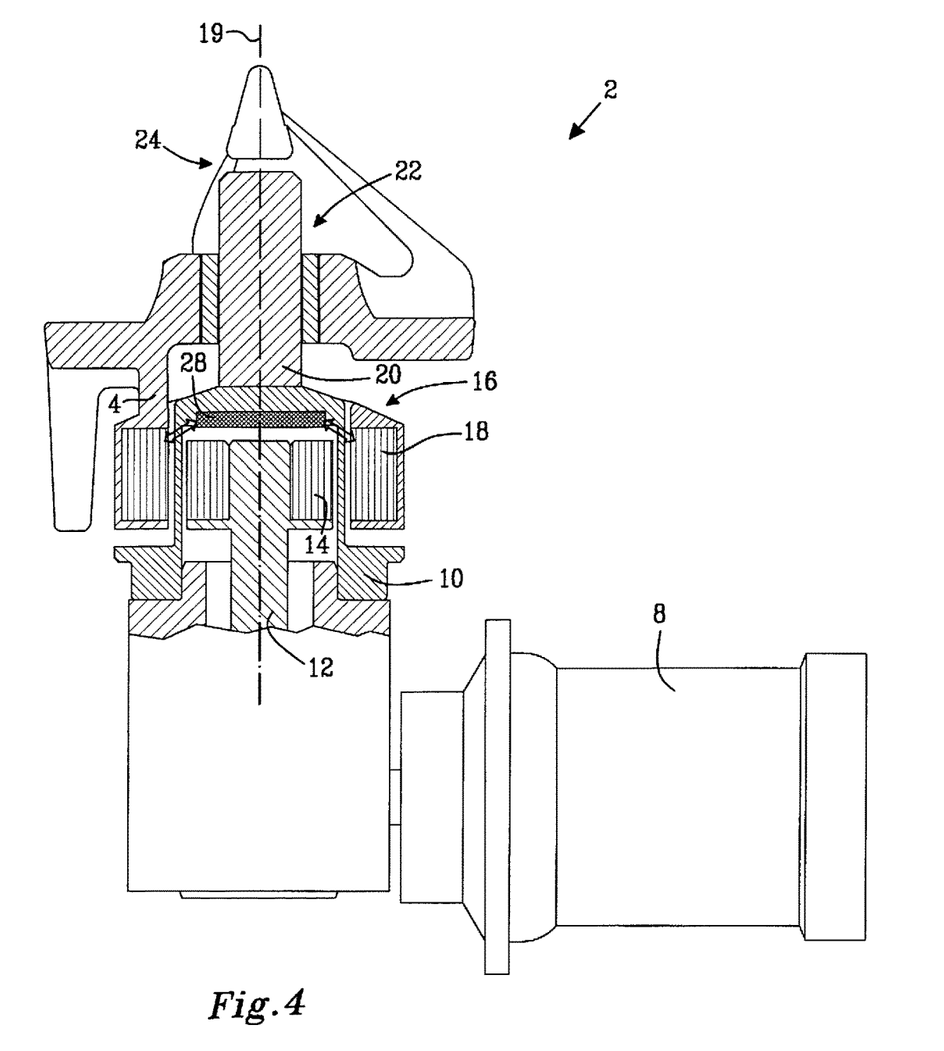
Figure 5:
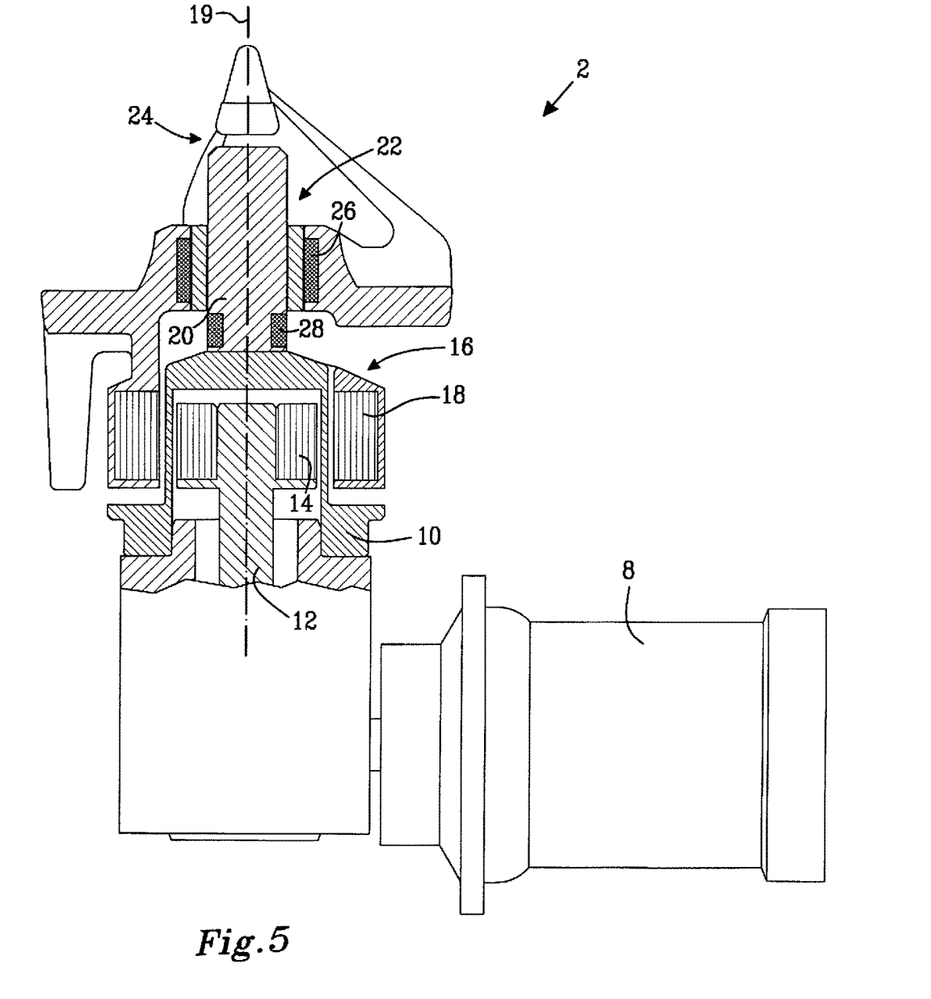

FIGS. 3-5 illustrate in similar manner as FIG. 2, a section through a device 2 with a centre axis 19 for stirring a liquid or a granular material according to example embodiments. Inside a stationary housing 10 of the device 2 a vertical drive shaft 12 is arranged. The drive shaft 12 is driven by a non-shown outgoing axle of an electric motor 8. At an upper end of the drive shaft 12 there is arranged a first part 14 of a transfer arrangement 16 for contactless transfer of rotation of the drive shaft 12 to a stirring agitator 4. The stirring agitator 4 comprises at its base a second part 18 of the transfer arrangement 16.

FIG. 3 shows the device 2 with the means for generating a magnetic force exerting an upwardly directing force component on the stirring agitator 4 and the first element 26 and the second elements 28 comprises a permanent magnet 26, or optionally iron, arranged in a top portion of the stationary axle and a permanent magnet in the form of a ring magnet 28, or several separate magnets arranged in a ring, arranged in the stirring agitator at a level below the permanent magnet 26 arranged in the top portion of the stationary axle. Both magnets are arranged with their poles such that the magnets attract each other thus exerting an upwardly directed force component on the stirring agitator 4.

FIG. 4 shows the device 2 with a piece of magnetic material 28 such as iron arranged in the stationary axle right above the drive shaft, or at a position near the drive shaft, and a permanent magnet or several separate magnets arranged in the stirring agitator 4 at a level below the magnetic material 28. The embodiment of FIG. 4 can have separate magnetic components at the second part 18 of the transfer arrangement 16 or optionally use existing magnetic components in the second part 18 of the transfer arrangement 16 of the stirring agitator 4. As mentioned, the permanent magnet or permanent magnets may thus form part of the transfer arrangement for contactless transfer of rotation. The permanent magnet or permanent magnets attract the magnetic material thus exerting an upwardly directed force component on the stirring agitator, in FIG. 4 visualized by two arrows.

FIG. 5 shows a permanent magnet in the form of a ring magnet 26, or several separate magnets arranged in a ring, arranged in the stirring agitator 4 and a permanent magnet 28 arranged in a the stationary axle at a level below the permanent magnet, or magnets, in the stirring agitator. Both magnets are arranged with their poles such that the magnets repel each other thus exerting an upwardly directed force component on the stirring agitator. As is noticed, the first element 26 and the second element 28 are arranged such that the centre axis 19 extends through, or in the near proximity of, the first element 26 and/or the second element 28. In FIG. 5, the ring magnet 28 is in the near proximity of the centre axis 19.

Therefore, it is to be understood that the foregoing is illustrative of various example embodiments and is not to be limited to the specific embodiments disclosed and that modifications to the disclosed embodiments, combinations of features of disclosed embodiments as well as other embodiments are intended to be included within the scope of the appended claims.

The invention claimed is:
1. A device for stirring comprising:
   a stationary axle extending substantially along a longitudinal axis of the device;
   an agitator selectively rotatable about the stationary axle;
   a drive shaft operable to selectively rotate about the longitudinal axis;
   a first arrangement of magnetic elements configured to transfer rotational movement of the drive shaft to rotational movement of the agitator including a first magnetic element associated with the drive shaft, and a second magnetic element associated with the agitator, the second magnetic element disposed substantially parallel to the first magnetic element; and
   a second arrangement of magnetic elements configured to be the primary support for the agitator relative to the stationary axle, the second arrangement including a third magnetic element disposed on the stationary axle at a position remote from the drive shaft, and a fourth magnetic element disposed on the agitator, wherein at least one of the third magnetic element and the fourth magnetic element intersects the longitudinal axis.

2. The device of claim 1, wherein either or both of the first magnetic element and the second magnetic element comprise a permanent magnet.

3. The device of claim 1, wherein the stationary axle extends from a housing.

4. The device of claim 1, wherein both the third magnetic element and the fourth magnetic element intersect the longitudinal axis.

5. The device of claim 1, further comprising a bearing disposed between the stationary axle and the agitator.

6. The device of claim 1, wherein either or both of the third magnetic element and the fourth magnetic element comprise a permanent magnet.

7. The device of claim 1, wherein the fourth magnetic element is disposed radially outward of the third magnetic element with respect to the longitudinal axis and includes a ring magnet or a plurality of separate magnets.

8. A device for stirring comprising:
   a stationary axle extending substantially along a direction of an axis of rotation, the stationary axle including a base portion and an extending portion;
   an agitator at least partially surrounding the extending portion of the stationary axle and configured to selectively rotate about the axis of rotation;

a drive shaft configured to selectively rotate about the axis of rotation;

a first magnetic arrangement configured to transfer rotational movement of the drive shaft into rotational movement of the agitator, including a first magnetic element associated with the drive shaft and a second magnetic element associated with the agitator, the second magnetic element arranged substantially parallel to the first magnetic element; and a second magnetic arrangement configured to support the agitator relative to the stationary axle, including a third magnetic element associated with the stationary axle and a fourth magnetic element associated with the agitator, wherein the fourth magnetic element is positioned radially outward with respect to the axis of rotation a first distance measured from the axis of rotation to a point on the fourth magnetic element closest to the axis of rotation, and the third magnetic element is positioned radially outward with respect to the axis of rotation a second distance, measured from the axis of rotation to a point on the third magnetic element closest to the axis of rotation, the first distance being greater than the second distance.

9. The device of claim 8, wherein either or both of the first magnetic element and the second magnetic element comprise a permanent magnet.

10. The device of claim 8, wherein the base portion of the stationary axle at least partially surrounds the drive shaft.

11. The device of claim 8, wherein the fourth magnetic element is a ring magnet or a plurality of magnets disposed about the axis of rotation.

12. The device of claim 8, further comprising a bearing disposed between the stationary axle and the agitator.

13. The device of claim 8, wherein the third magnetic element is a ring magnet or a plurality of magnets disposed about the axis of rotation, and the fourth magnet element is a second ring magnet or a second plurality of magnets disposed about the axis of rotation.

* * * * *